H. ROZE.
ELASTIC SUSPENSION FOR VEHICLE WHEELS.
APPLICATION FILED AUG. 8, 1911.

1,031,090.

Patented July 2, 1912.

Witnesses:
Claussa Franck
Eugene Wening

Inventor
Henri Roze
by
his Attorney

UNITED STATES PATENT OFFICE.

HENRI ROZE, OF DOMAINE DE HAUTE-FONTAINE, FRANCE.

ELASTIC SUSPENSION FOR VEHICLE-WHEELS.

1,031,090.  Specification of Letters Patent.  Patented July 2, 1912.

Application filed August 8, 1911. Serial No. 642,998.

*To all whom it may concern:*

Be it known that I, HENRI ROZE, a citizen of the Republic of France, residing at Domaine de Haute-Fontaine, par les Grandes-Côtes, Marne, France, have invented new and useful Improvements in Elastic Suspension for Vehicle-Wheels, of which the following is a specification.

This invention relates to elastic suspensions for the wheels of cycles and other vehicles of the type described in my previous application for Letters Patent, Serial Number 571637.

The present invention relates more particularly to the means for regulating the displacements of the elastically suspended wheel spindles, which means consisted in two toothed members such as spur pinions keyed on the ends of the suspended spindle and each meshing with a corresponding toothed member such as a rack carried by the corresponding part (rod, fork branch or other part) of the double supporting means for the spindle whereby the elastic displacement of the spindle can take place only parallel to itself.

The present invention has for object to provide means whereby the teeth of the pinion are compelled to remain in perfect working relation with those of the rack, and consists in arranging one or more springs in such a manner as to effect this purpose.

Figure 1:
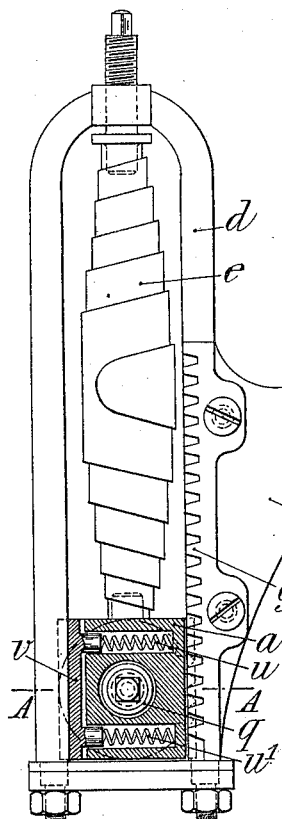
Figure 2:
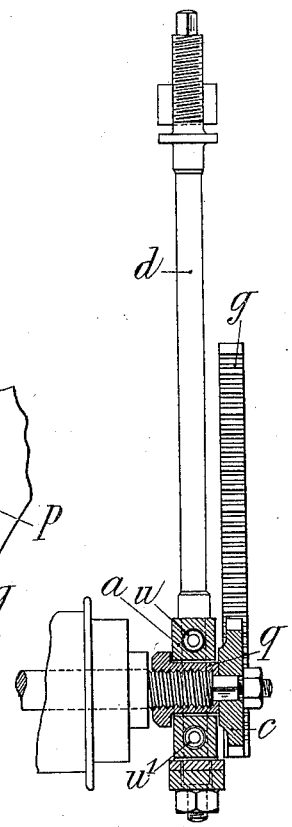
Figure 4:
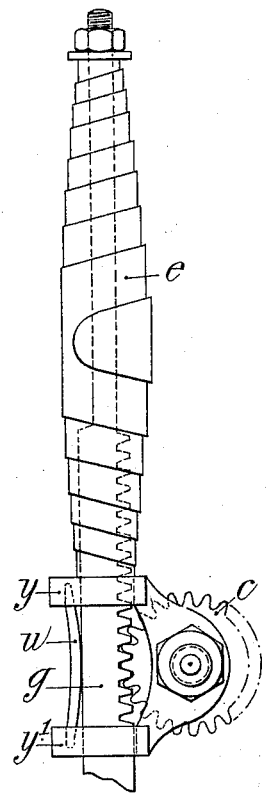
Figure 3:
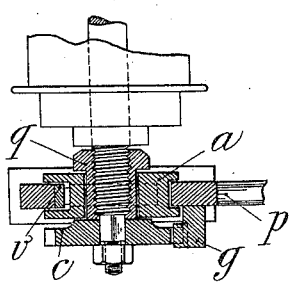

Two examples of this improvement are illustrated by way of example in the accompanying drawing, in which, Figures 1, 2 and 3 illustrate in end elevation and partial section, front elevation and partial section, and sectional plan on the line A—A of Fig. 1, respectively, a first constructional form of the elastic suspension provided with the present improvement. Fig. 4 illustrates a second example in side elevation.

In the example of Figs. 1, 2 and 3 the means for compelling the pinion $c$ to remain continuously in suitable working relation with the rack $g$, consist of a plate $v$ against which abut two spiral springs $u$, $u'$ the other ends of which abut against the bottom of borings in the slide block $a$, in each of which borings one of the springs is lodged. The springs $u$, $u'$ press the plate $v$ with suitable force against one of the arms of the guide member $d$ which does not carry the rack $g$. There is thus a continual tendency to press the slide block $a$ toward the other arm of the guide member and consequently to keep the pinion $c$ in gear with the rack $g$.

In the example shown in Fig. 4 a single arc-shaped spring $u$ abuts at its center that is at the apex of its curvature, against the single guide rod, while the ends of the spring abut against two collars $y$, $y'$ carried by the bearing block which in this example is the equivalent of the slide block $a$.

The spring $e$ which insures the elasticity of the displacement of the spindle is preferably formed of a strip of metal rolled up on itself to form a double cone as shown in Figs. 1 and 4.

Having now described my invention what I claim as new and desire to secure by Letters Patent is:—

1. In a device of the character described, the combination with a wheel spindle and a toothed member carried thereby, of a guide member provided with teeth adapted to be engaged by the teeth of the first mentioned member, and resilient means tending normally to maintain the teeth of both said members in mesh.

2. In a device of the character described, the combination with a fixed toothed guide, of a wheel spindle and a toothed member carried thereby and movable in relation to said guide, and resilient means adapted to normally maintain the teeth of said toothed member in mesh with the teeth of said guide.

3. In an elastic suspension for vehicle wheels, a toothed member carried by the vehicle frame, a toothed member carried by the wheel spindle and gearing with the first toothed member, means whereby the wheel spindle is guided during its displacement in the vehicle frame, an elastic member controlling the displacements between the wheel spindle and the vehicle frame, and spring means for holding the two toothed members in continuous operative relationship.

4. In an elastic suspension for cycle wheels a fork guide carried by the frame, internal rack teeth in one arm of the fork, a slide block capable of displacement between the arms of the fork, a wheel spindle bearing in the slide block, a spur pinion on the end of the spindle meshing with the rack teeth, an elastic member controlling the displacements between the slide block and the fork guide, a plate between the side of the slide block and the plain arm of the fork, and springs between the said plate and the slide block, lodged in borings in the slide block.

In testimony whereof I have signed my name to this specification in the presence of two subscribing witnesses.

HENRI ROZE.

Witnesses:
    LOUIS FAUTRAT,
    H. C. COXE.

---

Copies of this patent may be obtained for five cents each, by addressing the "Commissioner of Patents, Washington, D. C."